United States Patent [19]

Straub et al.

[11] Patent Number: 5,809,295
[45] Date of Patent: Sep. 15, 1998

[54] METHOD AND APPARATUS FOR STORING COMPRESSED FILE DATA ON A DISK WHERE EACH MDFAT DATA STRUCTURE INCLUDES AN EXTRA BYTE

[75] Inventors: Eric John Straub; Richard P. Jernigan, IV, both of Kirkland; Scott D. Quinn, Issaquah; Peter Blackburn Stewart, Redmond, all of Wash.

[73] Assignee: Microsoft Corporation, Redmond, Wash.

[21] Appl. No.: 506,971

[22] Filed: Sep. 26, 1995

[51] Int. Cl.⁶ ................................................. G06F 17/30
[52] U.S. Cl. ........................ 395/601; 395/612; 395/602; 395/439; 364/222.81
[58] Field of Search .................................. 395/430, 600, 395/404, 601, 602, 612, 439; 364/222.81

[56] References Cited

U.S. PATENT DOCUMENTS

| | | | |
|---|---|---|---|
| 5,237,675 | 8/1993 | Hannon, Jr. ............................... | 395/425 |
| 5,506,580 | 4/1996 | Whiting et al. ........................... | 341/51 |
| 5,551,020 | 8/1996 | Flax et al. ................................ | 395/612 |
| 5,574,907 | 11/1996 | Jernigan, IV et al. .................. | 395/601 |

OTHER PUBLICATIONS

Peter Norton, Guide to DOS Updated to Cover 6.2, pp. 45–47,440,441,450–451, 1994.
Stac Electronic's Stacker, Data Sources Report, Computer Select, 1994.
Christopher Barr, "Stacker 3.1 for Windows and DOS", PC Magzine, vol. 12, No. 15, Sep. 14, 1993, pp. 124–126.

Primary Examiner—Wayne Amsbury
Assistant Examiner—Greta L. Robinson
Attorney, Agent, or Firm—Jones & Askew, LLP

[57] ABSTRACT

A method and apparatus for storing compressed file data stored on a disk. The method includes an improved format for the Compressed Volume File (CVF), and more specifically, 10 an improved format for the MDFAT data structure stored within the CVF. The improved format includes using an additional byte for maintaining each entry in the MDFAT data structure which increases the number of sectors within the Sector Heap that can be addressed and accessed. The improved format further allows compressed clusters to be stored in fragments in various portions of vacant storage space located throughout the Sector Heap. The new format for the MDFAT data structure includes a bit that identifies whether each cluster is being stored in fragments. The method stores the locations of each of the fragments in a Fragment Pointer List located in the first sector of the first fragment.

44 Claims, 13 Drawing Sheets

Compressed Volume File (CVF) Layout

| Name | Offset (sector) | Size (sectors) | Description |
|---|---|---|---|
| MDBPB | 0 | 1 | A structure which has an MS-DOS BPB plus DriveSpace-specific information. In particular, the MaximumCapacity of the CVF is stored here, which is used to determine the size of subsequent regions. Also, the version number of the volume is recorded here, which specifies whether the volume is a DoubleSpace volume (MS-DOS 6 or 6.2 and Windows 95), a DriveSpace volume (MS-DOS 6.22), or a DriveSpace 3 volume (Plus!). |
| BitFAT | 1 | varies | The BitFAT has a bit for each sector in the Sector Heap (see below). A bit is 1 if the corresponding sector is in use, and is 0 if the corresponding sector is free. The space allocated for the BitFAT is a function of the MaximumCapacity of the CVF. The space in use will vary, depending on the current size of the sector heap. |
| Reserved 1 | ... | 1 | Reserved. This sector # is found at offset 36 of the MDBPB. |
| MDFAT | | varies | A table of 5 byte entries which maps FAT clusters to sectors in the SectorHeap which contain the (usually compressed) data for a cluster. There is an entry in this table for each cluster on the compressed drive. The size of this table is a function of the MaximumCapacity of the CVF. The starting sector# of the MDFAT is found by adding 1 to sector # found at offset 36 of the MDBPB. |
| Windisk sector | ... | 1 | Used by by Windows ScanDisk for restartability. |
| Reserved 2 | ... | 30 | Reserved. |

*MATCH LINE TO FIGURE 4A2*

FIG. 4A1

MATCH LINE TO FIGURE 4A1

| | | |
|---|---|---|
| Boot Sector | 1 | The boot sector for the DriveSpace drive. This is not used for booting, even if the DriveSpace drive is mounted as drive C. When Windows reads sector 0 from the compressed volume, this is the sector that is returned. This structure is described in the MS-DOS version 5 Programmer's reference on page 34. This sector # is found at offset 39 of the MDBPB. |
| Reserved 3 | varies | Reserved. This exists to position the Sector Heap (actually reserved4) at a desired sector-multiple offset in the CVF. The 1st DriveSpace stamp is at start of the first sector of this region. For DriveSpace 3 volumes, this is stamp 0xF8, 0x08, 0x22); for DriveSpace version 2 volumes, it is 0xF8, 0x44, 0x52. |
| FAT | varies | The FAT for the DriveSpace drive. This is a standard MS-DOS FAT. |
| Root Directory | 32 | The root directory for the DriveSpace drive. Starting sector # found at offset 41 of the MDBPB. |
| Reserved 4 | 2 | Reserved. |
| Sector Heap | varies, minimum is 60 | The sectors used to store (usually compressed) data for clusters. The sectors for a cluster are stored contiguously in the heap. When this space is all used, there is no more free space on the volume (even though Windows may think there is because there are clusters free in the FAT). Starting sector # found at offset #43 of the MDBPB. |
| 2nd Stamp | 1 | Second DriveSpace stamp ('M', 'D', 'R', 0) |

FIG. 4A2

MDBPB

| Name | Offset (byte) | Size (bytes) | Description |
|---|---|---|---|
| jmpBoot | 0 | 3 | jmp instruction to "boot" code |
| OEM Name | 3 | 8 | "MSDBL6.0" |
| bytes per sector | 11 | 2 | 512 |
| sectors per cluster | 13 | 1 | 64 (in D??SPACE volumes prior to DriveSpace 3, this was 16) |
| reserved sectors | 14 | 2 | This tells us how much padding to put before FAT and Root so Root ends on a cluster boundary (and Res4 begins a new cluster). In DriveSpace 3 CVFs, it ranges between 1 sector and 64 (csClu) sectors (in older CVFs, it was between csClu and 2csClu-1)) |
| number of FATs | 16 | 1 | 1 - DrvSpace simulates 2 FATs at runtime |
| number of Root Directory Entries | 17 | 2 | Value is 512 |
| zero | 19 | 2 | csec Total (not used - csec TotalD is used instead - this field is just zeroed). 0 means use DWORD count of sectors (offset 32) |
| media type | 21 | 1 | 0xF8 (media descriptor) |
| sectors per FAT | 22 | 2 | maximum number of sectors usable by the MSDOS FAT |
| sectors per Track | 24 | 2 | 17, ignored by DriveSpace |

FIG. 4B1   *MATCH LINE TO FIGURE 4B2*

MATCH LINE TO FIGURE 4B1

| | | | |
|---|---|---|---|
| count of heads | 26 | 2 | 6 ignored by DriveSpace |
| count of hidden sectors | 28 | 4 | determined by maximum capacity of drive, validated by ScanDisk - ALWAYS 0 |
| count of sectors | 32 | 4 | number of virtual sectors in MSDOS drive. This is the MaximumCapacity of the drive, in sectors. In older D??SPACE CVFs, this was equal to the physical size of the Sector Heap, multiplied by the Estimated Compression Ratio (ECR), but this no longer holds for DriveSpace 3 CVFs. |
| MDFAT start | 36 | 2 | logical sector of the start of MDFAT (relative to CVF start + 1) |
| bytes per sector log 2 | 38 | 1 | log base 2 of bytes per sector (i.e. 9) |
| Internal data | 39 | 2 | = DOS4_ROOT_DIR_SPACE/<br>our_bpb->dos_bpb.bytes_per_sector+<br>our_bpb->sqztor_cluster_o+<br>(no_of_clust*4+ /*next is for round up*/<br>our_bpb->dos_bpb.bytes_per_sector-1)/<br>our_bpb->dos_bpb.bytes_per_sector:<br>(Size of MDBPB (1sec) + BitFAT + Res1 (1sec) + MDFAT + Res2 (30 sec) + WinDisk Sector (1 sec)) |
| Root Directory Start | 41 | 2 | logical sector of the Root Directory (first_root) |

MATCH LINE TO FIGURE 4B3

FIG. 4B2

MATCH LINE TO FIGURE 4B2

| | | | |
|---|---|---|---|
| Sector Heap Start | 43 | 2 | logical sector of the beginning of the physical sector heap (first_data) |
| First Data Cluster | 45 | 2 | number of MDFAT entries (clusters) which are occupied by the DOS boot sector, reserved area, and root directory (first_clu) Note: first_clu = (first_data/csClu) - 2 |
| count BitFAT pages | 47 | 2 | count of 2k pages in the BitFAT |
| volume flags | 49 | 1 | flag field, bits 1-7 reserved zero. bit 0 set means some data encrypted |
| log 2 sectors per cluster | 50 | 1 | log base 2 of sectors per cluster (Now 6, instead of 4) |
| CVF version number | 51 | 2 | 100h |
| reserved | 53 | 8 | was minfile and maxfile, no longer required |
| fat size | 61 | 1 | 1 -> 12 bit FAT  0 -> 16 bit fAT |
| CVF Max | 62 | 2 | maximum capacity of CVF in MegaBytes, defined by limitation of the initial allocation for the MDFAT, FAT and BITFAT during creation of the volume. This limit is defined when the volume is created so future resizing of the drive will not cause fields to go beyond the allocated limit. |
| ECR numerator | 64 | 4 | The numerator of a fraction that evaluates to the Estimated Compression Ratio of the drive |
| ECR denominator | 68 | 4 | The denominator of a fraction that evaluates to the Estimated Compression Ratio of the drive |

35 — ECR numerator
36 — ECR denominator

FIG. 4B3

MDFAT

| Bit Offset | Size (bits) | Name | Description |
|---|---|---|---|
| 0 | 23 | secStart | 23 bit "sector number" of the first sector in the Sector Heap used to store the data for this sector. Some clusters may have addition allocations for fragments embedded within the data sectors. Add one to this number to get the CVF sector number. |
| 23 | 1 | Reserved | Reserved for future use. |
| 24 | 1 | fUltraTried | UltraPack has been attempted on this cluster. So either a) the data is compressed in UltraPack format, or b) the data won't get smaller if compressed with UltraPack, so don't bother attempting again during recompress. |
| 25 | 1 | fFragmented | 1-> cluster has fragment header, 0-> no fragments. |
| 26 | 6 | csecCoded | 6 bit count of the number of sectors (minus 1) used to store the information for this cluster, or for the first fragment for this cluster. If a cluster is stored fragmented (see the fFragmented bit), the csecCoded value indicates the length of only the first fragment, which contains the fragment pointer list and possibly compressed data. |
| 32 | 6 | csecPlain | 6 bit count of the number of sectors required to store the data for this cluster in uncompressed format. |
| 38 | 1 | fUncoded | Flag indicating if data for this cluster is stored compressed (0) or uncompressed (1). Data is stored uncompressed when DriveSpace cannot compress it, to avoid taking more space than the uncompressed data requires. |
| 39 | 1 | fUsed | Flag indicating that this MDFAT entry is in use (1) or unused (0). This bit is used by DRVSPACE.BIN in part to support undelete operations. |

FIG. 4C

Sector Heap — fragment pointer list

| Bit Offset | Size (bits) | Name | Description |
|---|---|---|---|
| 0 | 23 | secStart | 23 bit "sector number" of the first sector in the Sector Heap used to store the data for this sector. Add one to this number to get the CVF sector number. |
| 23 | 3 | Reserved | Reserved for future use. |
| 26 | 6 | csecCoded | 6 bit count of the number of sectors (minus 1) used to store the information for this fragment of the cluster. |

FIG. 4D

SECTORS | 1 | 2 | 3 | 4 | 5 | 6 | 7 | 8 | 9 | 10 | 11 | 12 | 13 | 14 | 15 | 1001 | 1002 | 1003 | 1004 | 1005 | 1006 | 1007 | 1008 | 1009 | 1010 | 1011 | 1012 | 1013 | 1014 |

FRAGMENTS | 1 | FULL | 3 | FULL | 5 | FULL | 7 | 2 | FULL | 4 | FULL | 6 | FULL | 8 |

FIG. 5A

Fragment Pointer List

| FRAGMENT NUMBER | STARTING SECTOR | FRAGMENT LENGTH (SECTORS) |
|---|---|---|
| 1 | 1 | 3 |
| 2 | 1001 | 2 |
| 3 | 6 | 1 |
| 4 | 1005 | 1 |
| 5 | 9 | 2 |
| 6 | 1008 | 2 |
| 7 | 14 | 2 |
| 8 | 1012 | 3 |

FIG. 5B

METHOD AND APPARATUS FOR STORING COMPRESSED FILE DATA ON A DISK WHERE EACH MDFAT DATA STRUCTURE INCLUDES AN EXTRA BYTE

TECHNICAL FIELD

The present invention relates to an improved method, apparatus, and format for storing compressed file data on a disk.

BACKGROUND OF THE INVENTION

One of the media utilized by computers to store data is a magnetic disk drive. Magnetic disk drives allow computers to alter the data that is stored thereon, such that data can be read from and written onto the magnetic disk. The data is usually stored on the disk in groups called files, with each file being independently accessible. The location on the disk where each file is stored is identified and stored in a data structure so that the computer can quickly access the necessary data when desired.

The storage area on the disk is divided into concentric circles called tracks. The number of tracks on a disk depends on the size of the disk. It is not uncommon for a disk to have over one thousand concentric tracks. Each track on the disk is divided into an equal number of sectors. Typically, the sectors are arranged in slices, such that the sectors at the outer edge, or beginning, of the disk take up more linear space along a track than the sectors near the inner edge, or end, of the disk. However, the data stored within each sector is arranged such that each sector contains an identical amount of data. The location of each sector is stored in a special data structure on the disk, thereby making each sector independently accessible.

The operating system of the computer groups the sectors of the disk into clusters. It should be understood that this grouping of sectors into clusters is performed by the operating system of the computer, and is thus not a physical delimitation. For a disk that stores uncompressed data, every cluster on the disk contains the same number of sectors. A cluster usually comprises from one to sixty-four sectors, depending on the size of the disk, with each sector storing 512 bytes of data. A special data structure on the disk contains a list of all clusters on the disk, thereby making each cluster independently accessible.

The operating system of a computer stores uncompressed data in one or more clusters on the disk. A cluster thus contains the contents, or a portion thereof, of a single file. Large files may require several thousand clusters to hold all of the data associated with the file, but extremely small files can be stored in a single cluster. Because a cluster only stores data from a single file, several sectors of the cluster will not be used to store other data if the file does not contain enough data to fill all the sectors of the cluster.

Magnetic disk drives include a stack of several rigid aluminum disks, or platters, coated with magnetic material. Each platter stores data on both its top and bottom surfaces. Data is encoded on the each of the disks by magnetizing areas of the disk surface. Data is retrieved or added to the disk by a read/write head. Each head of the magnetic disk drive consists of a tiny electromagnet attached to a pivoting arm, with the electromagnet being positioned very close to the surface of the disks. One such head is provided for each recording surface on each platter. The arms pivot to move the heads back and forth over the surface of the disks in a generally radial path. Head actuators pivot the arms to control the movement of the heads. When data is written onto a disk, the head is positioned over the appropriate area of the disk where the data is to be written. An electrical current, supplied to the head, produces a magnetic field which magnetizes a small area of the disk near the head. This small magnetized area represents a digital bit. Similarly, when data is read from a disk drive, the head is positioned over the appropriate magnetized area of the disk, which induces a current in the head. The current induced in the head is then decoded into digital data.

The rigid platters of the disk drive are connected to a single spindle. The spindle is connected to a motor, which spins the disks in unison. Most disk drives include motors that spin the disks at a constant rate. Although the sectors of the disk may take up different amounts of space, the amount of data stored within each sector is identical. This allows the disks to spin at a constant rate to retrieve equal amounts of data regardless of the location of the sector on the disk.

When a new cluster on the disk is accessed, two mechanical operations must occur before the head actually begins to read or write data. First, the head, attached to a pivotable arm, is moved radially from the location of the current cluster to the location of the destination cluster. A certain amount of time is required for the arm holding the head to overcome the effects of inertia and friction so as to effect its movement. Additional time is required to allow the head to settle in a stationary position after its movement. Second, the head must wait for the appropriate cluster of the disk, containing the desired data, to spin beneath the head. Because the disk spins at a constant rate, the maximum amount of time that the head must wait for the desired cluster to pass beneath it is the time required for the platter to complete one spin. Therefore, each access of a new cluster creates an inherent delay due to the mechanical requirements of accessing the correct area of the disk.

The amount of data that one disk can store is limited by the size of the disk and the number of tracks thereon. However, a technique called data compression allows the data in a file to be stored in less space on the disk. Compression programs, as are well known in the art, typically identify frequently occurring strings of letters, words, or phrases and replace each string with a respective token. Because each token requires a much smaller space for storage than does the respective string, the file data requires less storage space. A file stored using such a technique is called a compressed file. When the compressed data is to be read, it is first accessed and then decompressed to be returned to its original form. Compressed files not only save disk storage space, but also can decrease access time because it can be faster for the computer to read and decompress a compressed file than to read an uncompressed file.

The file data contained in a single uncompressed cluster, when stored in compressed form, is called a compressed cluster. A compressed cluster requires fewer sectors to store data than an uncompressed cluster, and thus, more than one compressed cluster may be stored within the sectors required to store data of an uncompressed cluster. Unlike disk space allocation for uncompressed files, which are stored in cluster units, compression programs allocate disk storage space by sector units. Compression programs thus support variable-length clusters for the storage of compressed data because only as many sectors as are necessary to store each cluster in compressed form are allocated for that purpose. Therefore, compression programs may allow more than one compressed file to be stored within the sectors that would otherwise comprise a single uncompressed cluster. Variable-length clusters, used to store compressed data, allow previously vacant sectors in a cluster to be allocated to store data from another compressed cluster. This allows each sector of storage space on the disk to be available for storing compressed files.

Disk compression programs increase the amount of data that can be stored on a disk by compressing the data stored in each cluster so that it can be stored in fewer sectors than would be required to store the data in uncompressed form. The technique used by these compression programs is to compress all files on the disk and store them in a single, large file called the Compressed Volume File (CVF). Once the files are compressed and stored in the CVF, any attempt to access one of the files will be intercepted by compression device driver software. This device driver locates the file's compressed data within the CVF and executes the read or write request, decompressing or compressing the file data as necessary.

The location of compressed file data stored on a disk must be maintained to allow the operating system of the computer to access files when desired. Several data structures exist within the CVF that are used for file access. It should be understood that the data structures discussed below are maintained by the operating system of the computer and are provided merely as an example of the necessary data structures. Other data structures may be maintained by alternate operating systems that perform similar functions to achieve similar results.

The first sector in the CVF contains a data structure called the Microsoft DoubleSpace BIOS Parameter Block (MDBPB). The MDBPB contains information that describes the characteristics of the drive, including how many bytes are contained per sector, how sectors are contained per cluster, and the total number of clusters on the drive.

The Boot Sector comprises one sector within the CVF, and is identical to the Boot Sector found in the MS-DOS operating system, and is well known to those skilled in the art.

Each sector on the disk has a unique identifying number, based on the location of the sector on the disk, so that it can be easily accessed. Similarly, each cluster has a unique cluster number. Identifying numbers are assigned such that adjacent sectors and clusters, respectively, are consecutively numbered. The primary data structure used for determining what parts of the disk are being used for file data storage is the File Allocation Table (FAT). The FAT for a compressed drive is identical to the FAT for an uncompressed drive. The FAT contains one entry for each cluster identified on the drive.

For an uncompressed drive, the sectors used to identify FAT clusters are sequentially located on the disk, usually beginning with the outermost sectors on the disk. Clusters are listed in the FAT sequentially by their cluster number, beginning with the outermost clusters on the disk. If each cluster on an uncompressed drive contains, for example, eight sectors, then the first eight contiguous sectors would be identified as cluster 1, the next eight contiguous sectors would be identified as cluster 2, and so on throughout the disk. Because clusters for uncompressed drives are sequentially numbered, the operating system can easily locate the sector number for a given cluster by multiplying the cluster number by the number of sectors per cluster.

The FAT entry for each cluster contains the number of the cluster in which the next part of that file is contained. The FAT entry for the cluster containing the last data of a file comprises an End of File (EOF) entry. Therefore, each file stored on the disk is represented in the FAT as a chain of one or more clusters. Thus, the FAT indicates whether each cluster is allocated to a file, but does not tell the operating system of the computer to which file a given cluster belongs.

A compressed drive also maintains a FAT. The FAT for a compressed drive is identical to the FAT maintained for an uncompressed drive in that the FAT contains one entry for each cluster on the disk. However, the clusters in a compressed drive can be variable in length and, furthermore, sequentially numbered clusters need not be physically adjacent. Thus, the operating system cannot determine, merely by examining the FAT, in what sector number compressed data for a given cluster is stored.

Another data structure, called the Root Directory, hereinafter referred to as the Directory, includes a list of all files and subdirectories stored on the disk. The Directory differs from subdirectories in that the Directory is stored near the beginning of the disk prior to sectors used to store file data. Subdirectories are stored in sectors on the disk in the same manner as are files, and the location of first-level files and subdirectories is maintained in the Directory. The Directory has an entry, for each file, containing the cluster number in which the first part of that file is stored. By storing the starting cluster number of each file, the Directory ties each file to the FAT.

An additional data structure, called the Sector Heap, occupies the majority of the space within the CVF. The Sector Heap is an array of sectors in the CVF in which the compressed data is actually stored. The first sector of each compressed cluster contains a compression tag that indicates the degree of compression that has been applied to the data.

Another data structure maintained in the CVF is the Microsoft DoubleSpace File Allocation Table (MDFAT). Microsoft DoubleSpace is a data compression program included in MS-DOS. The MDFAT keeps track of where the uncompressed data for each cluster is stored in compressed or uncompressed form within the CVF. The MDFAT parallels the FAT and contains an entry for each respective entry in the FAT. For each FAT entry, the corresponding MDFAT entry indicates in what sectors within the Sector Heap that cluster's compressed data is stored. Thus, by examining the FAT and corresponding MDFAT entries, the operating system can determine in which sectors compressed data for a cluster is stored.

A further data structure stored in the CVF on compressed drives is the BitFAT. The BitFAT is a table containing one bit for each sector in the Sector Heap. Each bit indicates whether the respective sector is being used to store data or whether the sector is unused. Therefore, available sectors can be identified by the operating system by scanning the BitFAT.

To access a file on the disk, the operating system of the computer reads the Directory entry for the file to determine the first cluster number in which file data is stored. The operating system then reads the entire chain of FAT entries starting at the file's first cluster. Using the location of the sectors used to store data for each cluster, as found in the MDFAT, and the chain of clusters from the FAT, the operating system can determine every compressed cluster belonging to the file and can access all sectors of each compressed cluster.

In some methods of storing uncompressed data, fragmentation may occur when data on a disk is deleted and new data is added. Fragmentation is the storing of portions of a single file in non-adjacent locations on the disk. When previously-used disk space is made available, the operating system of the computer stores new file data in the first available vacant space. However, the first available vacant space may be too small to store all of the new file data to be stored. Therefore, a portion of the new file data will be stored in the first available vacant space and any leftover data will be stored in the next available vacant space. Thus, a file may be stored in several non-adjacent groups of clusters on the disk, and is thus called a fragmented file.

Storing uncompressed data in fragmented locations on the disk is beneficial in that it allows the vacant spaces throughout the disk to be filled by new data being written onto the disk. If storing data in fragments is not utilized, and the new data is too large to be stored within a single one of the smaller portions of vacant space located throughout the disk, then the smaller portions of vacant disk space scattered among filled clusters are not utilized, and the vacant space is wasted.

Compressed file data can become fragmented in the same manner as uncompressed file data. Because compression programs allocate disk space for storage of compressed data by sector rather than by cluster, the groups of sectors in the Sector Heap in which the compressed clusters of a file are stored may not be adjacent to one another. Additionally, the unused sectors within the Sector Heap may become scattered around the disk, rather than being consolidated at the end of the Sector Heap.

This is demonstrated in FIGS. 1A and 1B. FIG. 1A shows uncompressed data of File A (identified as A1 and A2), uncompressed data of File B (identified as B1 and B2), and uncompressed data of File C (identified as C1, C2, C3, and C4) stored in adjacent clusters comprising a contiguous run of sectors 1 through 64. FIG. 1B shows how the uncompressed data of FIG. 1A may be stored in compressed form. FIG. 1B shows how compressed data may occupy only a few of the sectors required to store the data of the cluster in uncompressed form, thereby leaving several vacant sectors within the Sector Heap. Thus, FIG. 1B shows compressed file data stored in groups of sectors interspersed with groups of vacant sectors.

Some prior methods of storing compressed data stored each compressed cluster only in a contiguous run of sectors, but did not store a compressed cluster in fragments in separate, non-contiguous groups of sectors on the disk. Therefore, some prior implementations of storing compressed data stored compressed clusters only in an empty space on the disk that provided sufficient space to store the compressed cluster in its entirety. If the empty space could not store the entire compressed cluster, then no portion of the compressed cluster would be stored in the empty space and the computer would search for another empty space sufficiently large to store all of the compressed cluster. Thus, in the example of FIG. 1B, the empty sectors would remain vacant unless a new compressed cluster to be stored is small enough to fit entirely within the vacant space. This causes many of the small empty spaces within the Sector Heap to remain unfilled and thus wastes disk space, adversely affecting the goal of complete maximization of the storage space on the disk.

Another prior method of storing compressed data allows the storage of the data of a compressed cluster in fragments scattered throughout the disk. However, this prior method utilizes a different manner of identifying the location of each fragment of the compressed cluster. This prior method stores, in each fragment, the location of the next fragment. Thus, this method would include storing the location of fragment 2 in fragment 1, storing the location of fragment 3 in fragment 2, and so forth for all fragments. This method of storing the location of each fragment suffers from the disadvantage of requiring access of the fragments based only on the fragment number and not on the location of the fragments. Such a storage method would necessitate the access of the fragments in numerical order, such that fragment 1 is accessed first, then fragment 2, then fragment 3, and so forth. This method does not provide a method for optimizing the access of each fragment because the location of each fragment is unknown to the computer until the immediately prior fragment is accessed.

Another prior method of storing the fragment locations involves storing the location of each fragment within the MDFAT. However, such a method requires that adequate space be allocated for each sector in the Sector Heap, because each of the sectors in the Sector Heap can potentially be used to store a fragment of a compressed cluster. Therefore, space must be allotted for storage of fragment locations for each sector, even though only a small percentage of sectors in the Sector Heap may actually be used to store a fragment. Therefore, for sectors that are not used to store fragments, the space allocated for storage of the fragment locations for that sector is wasted. Because of the very large number of sectors on a compressed drive, this prior method wastes a great deal of storage space when less than all of the sectors are used to store a fragment.

SUMMARY OF THE INVENTION

The present invention provides a method and apparatus for storing compressed file data on a disk. The method includes an improved format for the Compressed Volume File (CVF), and more specifically, an improved format for the MDFAT data structure stored in the CVF. The improved format includes using an additional byte for maintaining each entry in the MDFAT data structure. The use of an additional byte increases the number of sectors within the Sector Heap that can be addressed and accessed and thus increases the number of sectors that can be accessed for each FAT cluster. The improved format further allows compressed clusters to be stored in fragments in various portions of vacant space located throughout the Sector Heap. The new format for the MDFAT data structure includes a bit that identifies whether each compressed cluster is being stored in fragments. The method stores the location of each of the fragments in a Fragment Pointer List located in the first sector of the first fragment in the Sector Heap. The storage of the entire Fragment Pointer List in the first fragment allows the computer to obtain the locations of all fragments prior to initiating access of any fragment, thus allowing the computer to directly access a fragment. The storage of the Fragment Pointer List in the first fragment also eliminates the location of the subsequent fragment from being interspersed with data when all fragments are read into memory.

Thus, it is an object of the present invention to provide a method and system for storing compressed file data stored on a disk.

It is another object of the present invention to increase the amount of compressed data that can be stored on a disk.

It is a further object of the present invention to increase the number of sectors for storing compressed data that can be addressed and accessed.

It is a still further object of the present invention to store compressed data in fragments, when necessary, rather than in contiguous sectors.

It is a further object of the present invention to store the list of fragments using a minimum of disk storage space.

It is yet another object of the present invention to store the list of the location of each fragment entirely within the first fragment of the fragment chain.

It is a still further object of the present invention to allow access of all fragments while minimizing movement of the heads of the disk drive.

Other objects, features, and advantages of the present invention will become apparent upon reading the following specification, when taken in conjunction with the drawings and the appended claims.

BRIEF DESCRIPTION OF THE DRAWINGS

FIG. 4A is a table disclosing the format for the data structures comprising the Compressed Volume File.

FIG. 4B is a table disclosing the format for the MDBPB data structure of the Compressed Volume File.

FIG. 4C is a table disclosing the format of the MDFAT data structure of the Compressed Volume File, in accordance with the present invention.

FIG. 4D is a table disclosing the format of the Fragment Pointer List stored in the first sector of the first fragment within the Sector Heap.

FIG. 5A is a representation of a compressed cluster stored in fragments.

FIG. 5B is a tabular representation of the Fragment Pointer List for the fragments shown in FIG. 5A.

DETAILED DESCRIPTION OF THE PREFERRED EMBODIMENT

Turning next to the figures, the preferred embodiment will now be described in detail. The method of the present invention is useful in connection with a computer system which implements an improved format for storing data on a disk drive.

In general, the preferred embodiment provides an improved method for storing compressed clusters of file data on a disk. The method utilizes an improved format for the CVF, specifically a new format for the MDFAT data structure stored within the CVF. The improved format includes using an extra byte for maintaining each entry in the MDFAT data structure. The inventive format utilizes an MDFAT data structure having five bytes rather than four bytes, as used in prior implementations. The extra byte increases the number of sectors within the Sector Heap of the CVF that can be addressed and accessed, thus increasing the number of sectors available in each cluster.

The improved format allows clusters to be stored in fragments in small portions of vacant space located throughout the Sector Heap. The new format for the MDFAT includes a new bit that identifies whether the respective cluster is being stored in fragments. Additionally, the format stores the location of each of the fragments in a Fragment Pointer List located in the first sector of the first fragment.

Figure 2:
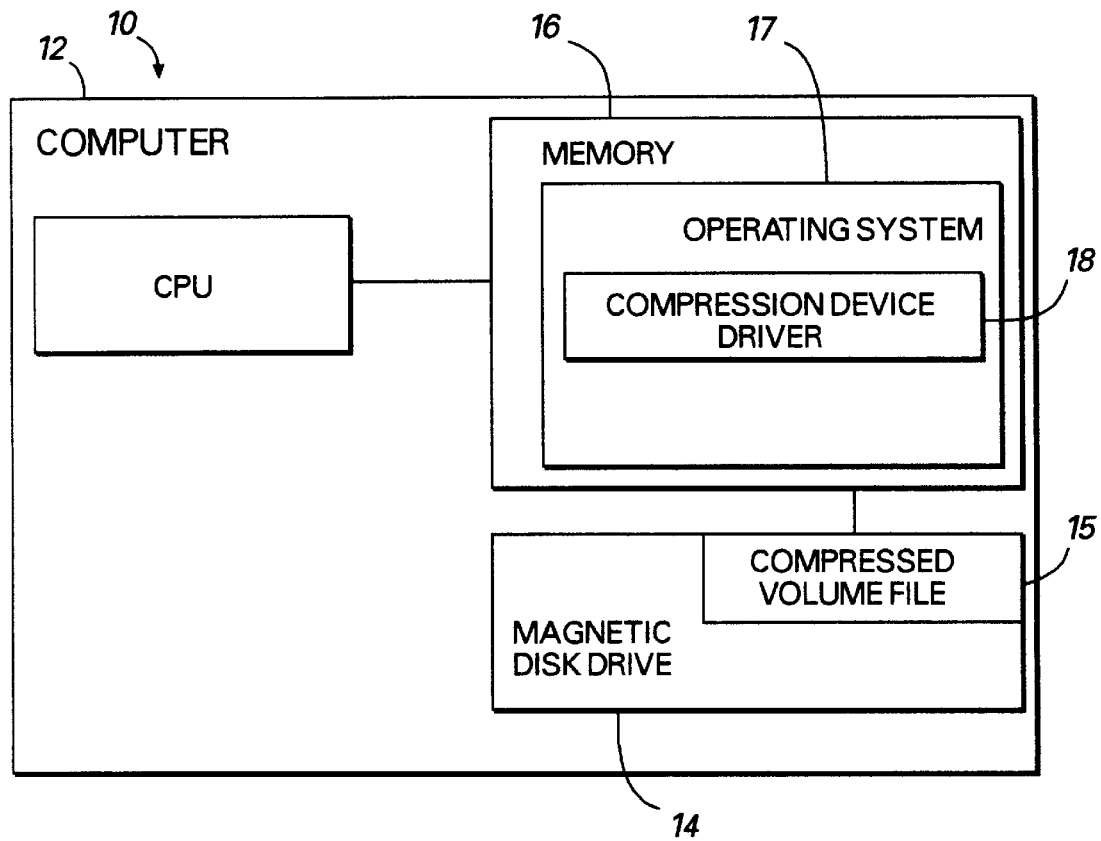
FIG. 2 is a block diagram of a computer system for implementation of the present invention.

As shown in FIG. 2, the method of the present invention is implemented on a computer system, generally shown at 10, comprising a computer 12, having a central processing unit 14, a disk drive 14, preferably a magnetic disk drive, having storage space at least partially occupied by data stored in compressed form within a Compressed Volume File (CVF) 15, and a memory 16 for storing an operating system 17. The operating system stored in memory includes a compression device driver 18 that intercepts any attempt by the operating system to access a compressed file stored within the CVF 15 on the disk drive 14. The CVF includes data structures such as the FAT, MDFAT, and Directory to permit access to the desired compressed file data within the CVF on the disk drive 14. The device driver accesses and reads the compressed data, then decompresses the data and delivers the decompressed data to the operating system for further action. When the operating system requests that data be written in compressed form within the CVF on the disk drive, the device driver 18 accesses the location where the data is to be written within the CVF 15, compresses the data, and writes the compressed data onto the disk drive.

The improved method and format for storing compressed data within the CVF is embodied in the data structures maintained on the disk within the CVF 15. Compressed data is stored in the Sector Heap of the CVF in accordance with the improved method and format. All requests for the compressed data are handled through the device driver 18, which permits the operating system to locate and access the desired compressed data.

Figure 3:
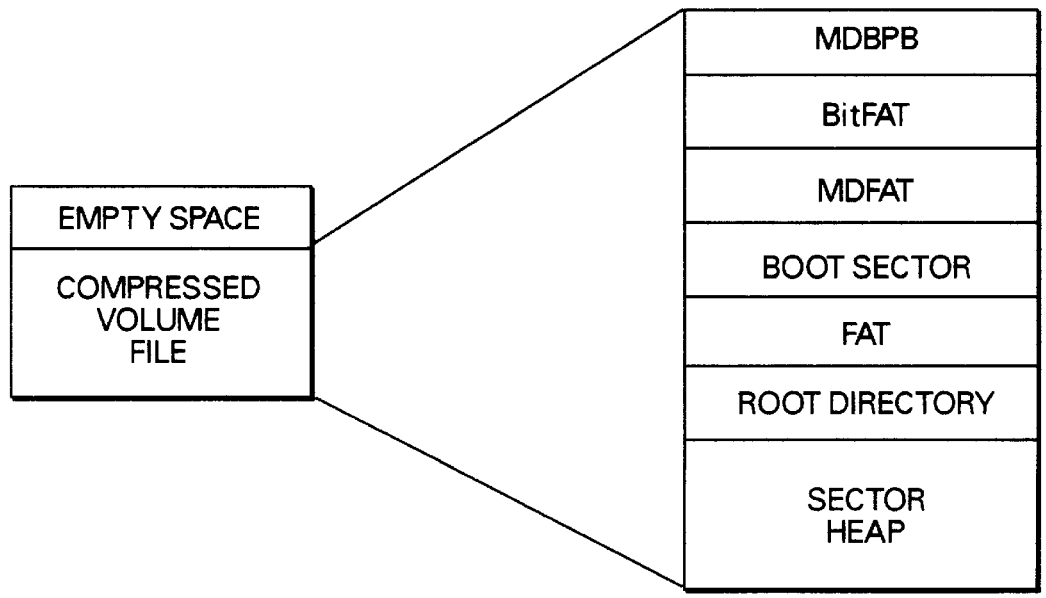
FIG. 3 is a representation of the data structures comprising the Compressed Volume File.

As shown in FIG. 3, the CVF includes several data structures that are well known in the art. The data structures described below are those maintained by the operating system of the computer in accordance with a method and format for storing compressed data on a disk. Those skilled in the art will understand that other similar data structures that perform similar functions may be maintained by this or other operating systems, and that the data structures described in accordance with the present invention need not be limited to use with any specific operating system.

A general description of the format of the CVF in accordance with the present invention is shown in FIG. 4A. The MDBPB data structure maintained in accordance with the present invention is further described in FIG. 4B.

The MDBPB contains information regarding the characteristics of the drive. For a compressed drive, the compression program determines a value called the Estimated Compression Ratio (ECR) to determine the expected amount of compression of compressed data on the drive. Prior methods determined the ECR by examining the ratio of the number of sectors the operating system determines are in the drive to the number of sectors in the Sector Heap. The operating system determines the number of sectors in the drive by multiplying the number of clusters in the drive by the number of sectors contained in each cluster.

However, the present format defines each cluster as containing more sectors than in prior formats. Therefore, if a drive utilizing the present inventive format that supports 64 sectors per cluster is the same size as a drive utilizing a prior format that supports only 16 sectors per cluster, and both use the same method of determining the ECR, the present format would have one-fourth the number of clusters as the prior format. This cluster shortage would cause the computer to determine that the drive is out of space because of the lack of available clusters in which to store data even though many available sectors exist.

Determining the ECR in accordance with the present invention is accomplished by first notifying the operating system that the drive has a very large number of sectors, preferably much larger than the actual number of sectors in the drive. This allows the operating system to determine that the drive has a large number of clusters, thereby eliminating the cluster shortage problem defined above. However, by using an erroneous number of sectors in the drive, the value of the ECR determined by examining the ratio of the number of sectors the operating system determines are in the drive to the number of sectors in the Sector Heap is likewise erroneous.

Because the ECR as determined above is erroneous, the present invention utilizes a new method of determining the ECR. The inventive method determines the ECR by taking the ratio of the values maintained in two new fields in the MDBPB. Among the fields in the MDBPB described in FIG. 4B are the "ECR numerator" field 35 that identifies the numerator of the ratio used to determine the ECR. Similarly, the "ECR denominator" field 36 identifies the denominator of the ratio used to determine the ECR. Thus, by comparing the values maintained in the ECR numerator and denominator fields, 35 and 36, respectively, the amount of compression, expressed as the ECR, can be determined. Thus, the ECR is determined from merely by examining the values maintained in the two fields 35 and 36 of the MDBPB, and is therefore independent of the size of the drive as seen by the operating system.

From FIG. 4A, it should be noted that each entry in the MDFAT is a five byte entry that maps each cluster identified in the FAT to the sectors in the Sector Heap that contain the compressed data for each respective FAT cluster.

Thus, the MDFAT data structure stored on the disk within the CVF includes an entry for each cluster identified in the FAT. The improved format includes an MDFAT data structure having a five byte entry for each FAT cluster on the compressed drive, as further described in FIG. 4C. The MDFAT contains five bytes of eight bits, for a total of forty bits for each entry. Prior art data structures of this kind contain only four byte entries. The extra byte used in the inventive format allows eight bits to be allocated within the MDFAT to obtain advantages heretofore unrecognized.

The allocation of each of the forty bits within the MDFAT is shown in FIG. 4C. The eight bits, added by the extra byte to each MDFAT entry, are allocated in fields 20, 21, 22, 24, and 26. The eight additional bits are allocated as follows: two bits have been added to the "secStart" field 20, one bit has been used to create a new "fUltraTried" field 21, one bit has been used to create a new "fFragmented" field 22, and two bits each have been added to the "csecCoded" field 24 and the "csecPlain" field 26.

Two bits have been added to the "secStart" field 20, making a total of 23 bits used for the field. The "secStart" field is used to identify the number of the first sector in the Sector Heap in which the data of each compressed cluster is stored. Therefore, the addition of two bits to this field yields a fourfold increase in the number of sectors in the Sector Heap that can be identified and addressed by the MDFAT. Therefore, the two additional bits added to this field effectively increases the size of the compressed drive by increasing the number of sectors in the Sector Heap that would otherwise remain unaddressable. For example, a 2 gigabyte compressed drive has approximately 64,000 clusters. If each cluster contains 64 sectors, then the total number of sectors on the drive is over 4 million. A "secstart" field of 21 bits, as used in prior implementations, can identify and address only approximately 2 million sectors. Therefore, the prior format left many sectors on compressed drives unaddressable. By contrast, the improved format of the present invention utilizes a 23 bit "secStart" field which is capable of addressing over 8 million sectors. Therefore, the improved format increases the number of addressable sectors and thus, the amount of data that can be stored on the compressed disk drive.

The use of a five byte MDFAT entry over the four byte entry used in prior implementations has the advantages described above. However, because the extra byte is used for each MDFAT entry corresponding to each FAT cluster on the compressed drive, the addition of an extra byte for each MDFAT entry creates a corresponding reduction in available space on the compressed drive. For instance, a 2 gigabyte compressed drive has approximately 64,000 clusters. Thus, one extra byte for each MDFAT entry uses an extra 64 kilobytes of storage space. The extra 64 kilobytes used by the MDFAT creates a corresponding reduction in available space on the disk. Thus, in this example, each extra byte used for each MDFAT entry results in a loss of 64 kilobytes of disk storage space.

Also, an MDFAT entry may not span a sector, i.e., the entry may not begin in one sector and continue in another sector. Each MDFAT entry is five bytes; thus, each sector in the MDFAT can store 102 entries totaling 510 bytes. Because each sector can store 512 bytes, each sector in the MDFAT leaves two bytes unused, thereby resulting in a loss of storage space.

Therefore, because each extra byte added to the MDFAT reduces the available space on the disk, and because the use of five bytes allows the MDFAT to address over 8 million sectors, it is preferred to limit the MDFAT entries to no more than five bytes.

As seen in FIG. 4C, the new "fUltraTried" field 21 has been created using one bit of the five byte MDFAT entry. This bit identifies when a recompression utility program has been attempted on the cluster so that the cluster may be skipped on subsequent passes of the recompression utility. The bit is cleared every time data is written to the cluster.

The new "fFragmented" field 22 has been created using one bit of the five byte MDFAT entry. This bit identifies whether the data for the compressed cluster is stored in fragments rather than in a contiguous run of sectors. Storing data in fragments is advantageous because it allows small portions of otherwise vacant disk space to be used for storage.

Two bits have been added to both the "csecCoded" field 24 and the "csecPlain" field 26 in the MDFAT. These fields identify the number of sectors used to store the data for each cluster identified in the FAT. Thus, each six bit field is capable of identifying 64 sectors for each cluster. Prior implementations used only four bits for each field, which were capable of identifying only 16 sectors for each cluster. The "csecCoded" field identifies the number of sectors used to store the compressed data of the entire cluster, if unfragmented, or, if the cluster is stored in fragments, the number of sectors used to store the first fragment. The "csecPlain" field identifies the number of sectors used to store the data for the cluster in uncompressed form.

If the data for the compressed cluster is stored in fragments, information regarding each fragment of the cluster is maintained on the disk. The location and method of storage of this information is another novel feature of the present invention.

Information regarding each fragment is stored in a Fragment Pointer List. The Fragment Pointer List is maintained in the first sector of the first fragment in which data of the compressed cluster is stored. The location of the first sector of the first fragment is identified by the "secStart" field of the MDFAT entry.

FIG. 4D shows the format of the Fragment Pointer List, which is stored in the first sector of the first fragment for identifying the location and length of each fragment of the compressed cluster. The Fragment Pointer List includes a 23 bit "secStart" field 30 for identifying the number of the sector in which the beginning of each fragment is stored. Also, a "csecCoded" field identifies the number of sectors used to store the data for each respective fragment. The Fragment Pointer List includes entries, defined by the above-described fields, for each fragment of the compressed cluster. A separate Fragment Pointer List will be stored for each compressed cluster that is stored in fragments.

The Fragment Pointer List is stored in the first sector of the first fragment. Following the Fragment Pointer List is a compression tag, preferably four bytes in length, for identifying the level of compression utilized for this compressed cluster. Data is then stored following the compression tag. Only as much space as necessary is used to store the Fragment Pointer List such that the first sector of the first fragment may include not only the Fragment Pointer List, but also the compression tag and data. Thus, while the first sector of the first fragment stores the Fragment Pointer List, it is not dedicated to storing only the Fragment Pointer List.

It should be understood that there are four types of clusters. An uncompressed, unfragmented cluster contains data stored in uncompressed form in contiguous sectors of the cluster. A compressed, unfragmented cluster stores data in compressed form, with the first four bytes of the cluster being a compression tag defining what type of compression was used to compress the data. A compressed, fragmented cluster, as discussed above, stores compressed data in fragments, with the Fragment Pointer List being stored in the first sector of the first fragment, followed immediately by a compression tag, and then data. An uncompressed, fragmented cluster stores data in fragments in uncompressed form, with the first sector of the first fragment being used to store only the Fragment Pointer List.

As stated above, an uncompressed cluster can also be stored in fragments. When an uncompressed cluster is stored in fragments, appropriate entries are made in the MDFAT including an entry of "1" in the "funcoded" field to identify that the cluster is stored uncompressed. The location of each fragment of an uncompressed cluster is similarly stored in a Fragment Pointer List. The Fragment Pointer List for uncompressed, fragmented clusters is identical to the Fragment Pointer List for compressed, fragmented clusters and is stored in the first sector of the first fragment. However, the first sector of the first fragment of an uncompressed, fragmented cluster contains only the Fragment Pointer List. No other data is stored in the first sector of the first fragment, thus, the Fragment Pointer List is stored by itself in the first sector of the first fragment. This differs from the first sector of the first fragment of a compressed, fragmented cluster, which stores not only the Fragment Pointer List, but also a compression tag and data.

Figure 1A:
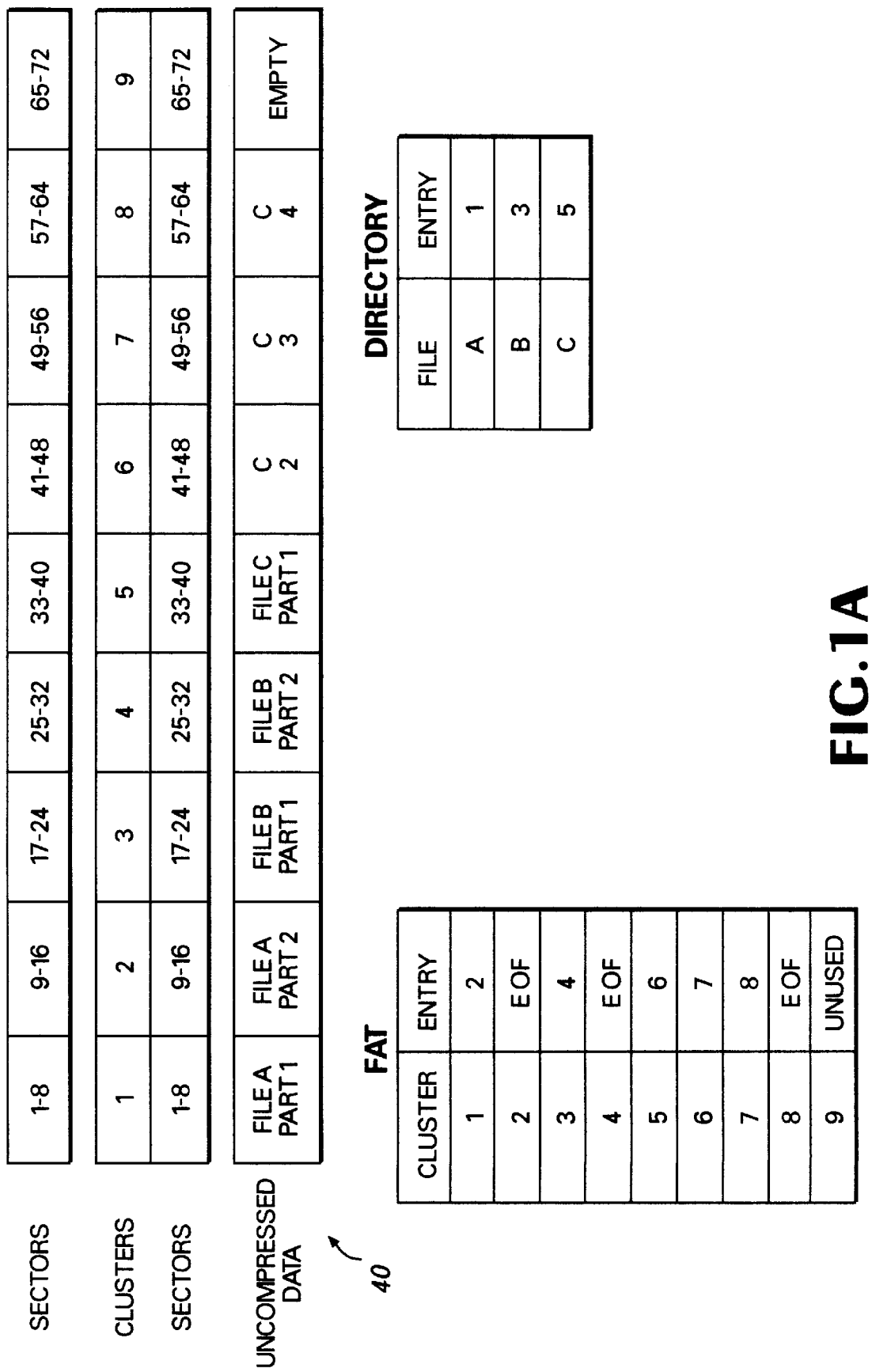
FIG. 1A is a representation of uncompressed file data stored in clusters on a disk.
Figure 1B:
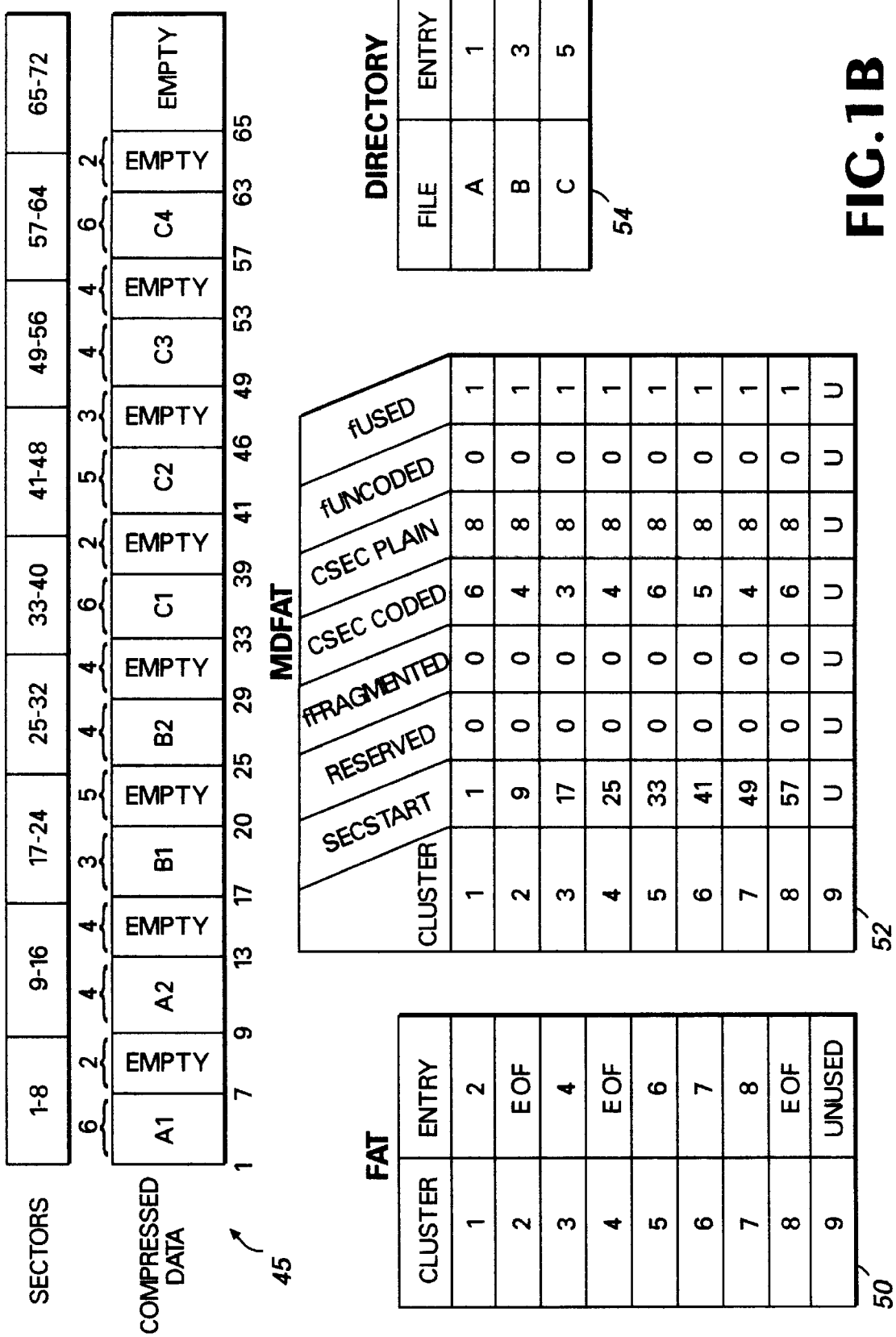
FIG. 1B is a representation of compressed file data stored on a disk in accordance with a prior method of data storage.
Figure 1C:
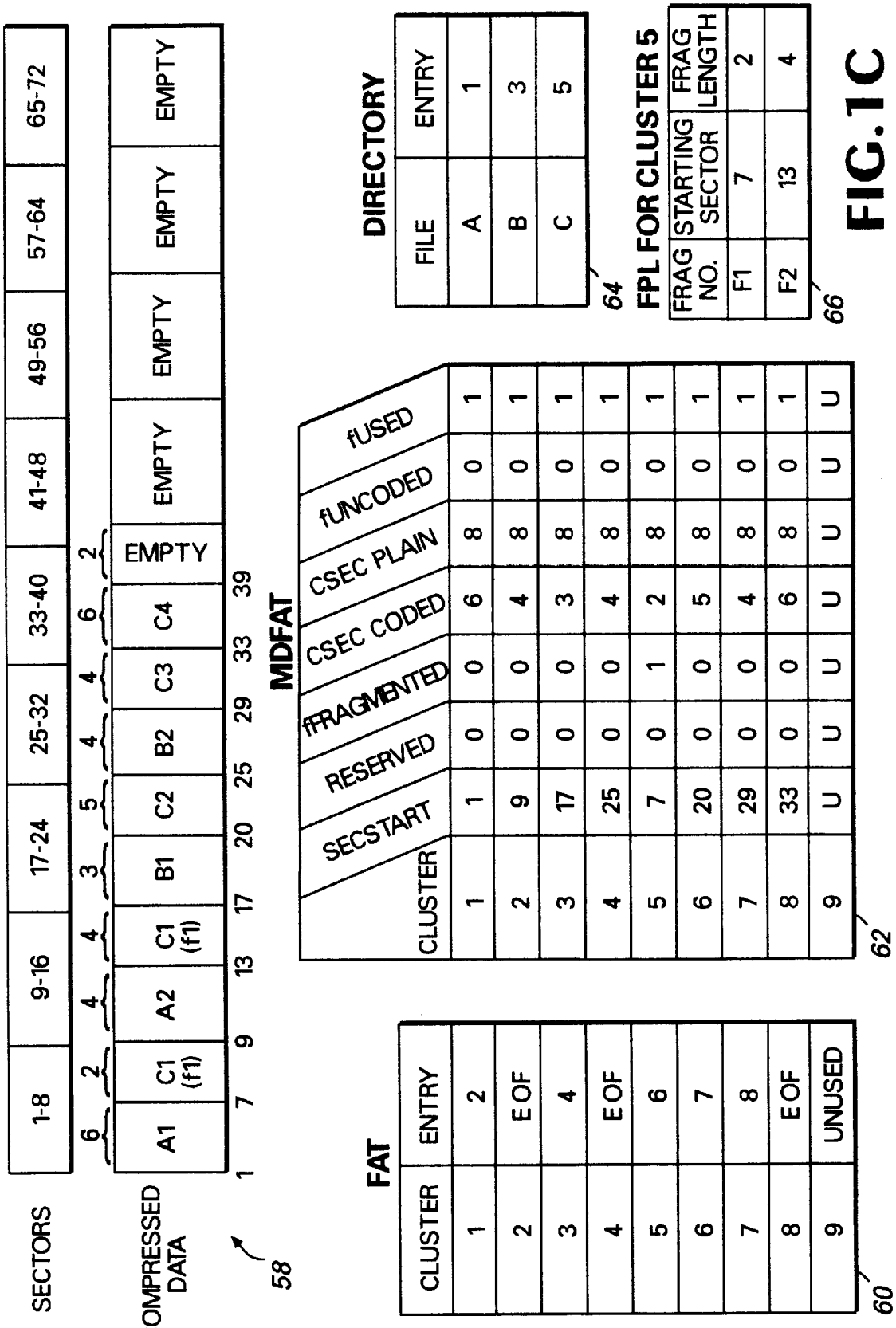
FIG. 1C is a representation of compressed file data stored on a disk in accordance with the data storage method and format of the present invention.

The storage of data in sectors on a disk is best illustrated in FIGS. 1A–C. These figures show data stored in clusters of eight sectors each. It should be understood that the length of these clusters, shown in these figures and discussed below, is used only for the purposes of illustration. The present invention supports clusters comprising 64 sectors, and thus the present invention should not be construed to be limited by the parameters of the figures discussed below.

FIG. 1A shows uncompressed data stored in adjacent clusters comprised of contiguous sectors on the disk, shown generally at 40. FIG. 1B shows how data may be stored in compressed form in non-adjacent sectors within the Sector Heap, shown generally at 45. It is seen that the data identified as Al in FIG. 1B has been compressed such that it is stored in fewer sectors than are required to store the data Al in uncompressed form, as shown in FIG. 1A. It is also seen that fragmentation exists because groups of empty sectors are interspersed among portions of compressed data. In prior methods, a group of empty sectors is only used to store the data of a cluster if that entire cluster can be compressed to fit within the group of empty sectors. Therefore, a small group of empty sectors may rarely be used to store data, thus reducing the capacity of the CVF.

Cluster data stored in compressed form is termed a compressed cluster. Thus, data A1, A2, B1, B2, C1, C2, C3, and C4 in FIG. 1B are each termed a compressed cluster. In prior methods of compressed data storage, when a compressed cluster is to be stored within the Sector Heap, the computer searches for a vacant space large enough to store the entire compressed cluster. Thus, the compressed cluster is typically stored in a contiguous run of sectors, and is therefore unfragmented. This is inefficient, because small portions of vacant disk space, as seen in the example of FIG. 1B, will not be used to store data from larger compressed clusters. For example, the two empty sectors between data A1 and A2 in FIG. 1B will not be used to store data unless an entire cluster can be compressed to fit within the two sectors. If no cluster can be compressed to such a level, then the two sectors will remain vacant.

FIG. 1B also shows the FAT 50, the MDFAT 52, and the Directory 54 for the unfragmented compressed data stored in the Sector Heap as shown at 45. It should be understood that these tables and their respective contents, as discussed below, are shown in a form slightly modified for ease of discussion, and these tables do not necessarily reflect the exact format or entries of the actual data structures in the CVF, as defined in FIG. 4A–C. It should also be understood that table entries marked "Unused", or "U", signify that the respective cluster includes no sectors that are presently being used to store data.

For example, it is seen that the "secStart" field in the MDFAT 52 shows that the starting sector for the data of compressed cluster 1 is sector 1. By comparison, as seen in FIG. 4C, the actual value stored in the "secStart" field of the MDFAT is the starting sector number minus 1. Thus, the actual entry for the "secStart" field in the MDFAT stored on the disk would be "0" instead of "1". Other minor differences may exist between the tables shown in the figures and the actual value of the entries in the tables, as defined in FIG. 4A–C.

In FIG. 1B, the compressed data is stored such that no compressed cluster is stored in fragments. This is also seen from the MDFAT 52, where the entries in the "fFragmented" field for each cluster is "0", thus designating each respective cluster as being stored unfragmented.

Similarly, FIG. 1C shows the FAT 60, the MDFAT 62, and the Directory 64 for the compressed data stored in the Sector Heap, as shown generally at 58. It should also be understood that these tables and their respective contents, as discussed below, are shown in a form for ease of discussion, and these tables do not necessarily include the exact format or entries of the actual data structures in the CVF, as defined in FIGS. 4A–C.

It is seen in FIG. 1C that the compressed cluster data C1, identified in the FAT 60 as cluster 5, is stored in two fragments. The first fragment F1 is stored in sector 7 and sector 8 and the second fragment F2 is stored in sector 13 through sector 16. This is also seen in the MDFAT 62, where it is seen that the "fFragmented" entry for cluster 5 is set to "1", thus identifying that the compressed cluster is stored in fragments. It is seen that the starting sector number for the data designated as cluster 5 is identified in the "secStart" field of the MDFAT 62 as sector 7, which corresponds to the location of the first sector of the first fragment F1, as identified by the data shown at 58.

A Fragment Pointer List 66 for the fragments comprising cluster 5 is also shown in FIG. 1C. The contents and format of the Fragment Pointer List are defined in FIG. 4D. The Fragment Pointer List 66 is stored in the first sector of the first fragment. Therefore, in this example, the Fragment Pointer List is stored on the disk in sector 7 within the CVF. The Fragment Pointer List identifies the location and length of each fragment used to store the data of a compressed cluster. In this example, because the data C1 of cluster 5 is stored in two fragments, the Fragment Pointer List for cluster 5 includes two sets of entries.

It is seen that the Fragment Pointer List identifies the starting sector number of each fragment as well as the number of sectors used to store each fragment. Thus, as seen at 66, the Fragment Pointer List identifies fragment 1 as being stored beginning in sector 7 and being two sectors in length. This corresponds to the illustration, shown generally at 58, of the first fragment of data C1 stored in sectors 7 and 8. Similarly, fragment F2 is identified in the Fragment Pointer List as being stored beginning in sector 13 and being four sectors in length. This corresponds to the fragment F2, shown generally at 58, being stored in sectors 13 through 16. Therefore, by examining the MDFAT 62 and the Fragment Pointer List 66, all data for a compressed cluster stored in fragments can be located.

It is seen from this example how, by allowing compressed data to be stored in fragments in various vacant sectors within the Sector Heap, the present invention utilizes empty spaces that, singularly, are too small to hold all the data of the entire unfragmented compressed cluster. Therefore, storing compressed clusters in fragments effectively utilizes every vacant portion of disk space, thus eliminating small pockets of empty disk space interspersed throughout the Sector Heap.

The novel method of storing the location and length of each fragment in a Fragment Pointer List has benefits heretofore unrecognized. By storing the location of all fragments in the first fragment, the computer can optimize access of all fragments, thus providing faster access of the data in the fragments.

For example, FIG. 5A shows data of a compressed cluster stored in eight fragments interspersed among sectors marked as "Full", i.e., sectors that are used to store data other than that of the compressed cluster. For the purposes of this example, the data of the compressed cluster is shown to be stored in eight fragments totaling sixteen sectors. It should be understood that the present invention does not limit storage of compressed data to sixteen sectors and that the sectors identified in FIG. 5A are identified and arranged merely for the sake of illustration.

FIG. 5B is an example of the Fragment Pointer List for the fragments shown in FIG. 5A. By examining the Fragment Pointer List, the operating system identifies the sectors used to store each fragment. The first fragment is stored beginning in sector 1, and is three sectors in length. Fragment 1 includes the entire Fragment Pointer List, stored in the first sector (sector 1) of the fragment, for identifying the sector number where each fragment begins as well as the number of sectors used to store each respective fragment. Following the Fragment Pointer List in the first sector of the fragment 1 is a compression tag, preferably four bytes in length, for identifying the level of compression utilized for this compressed cluster.

The storage of the Fragment Pointer List in its entirety in the first sector of the first fragment is advantageous over prior methods of storing the location of fragments. By storing the Fragment Pointer List in its entirety, the computer can access a fragment directly by obtaining the location of the fragment from the Fragment Pointer List, rather than having to access all prior fragments to obtain the location of the next fragment.

For example, if fragment 3 is to be accessed, the storage of the entire Fragment Pointer List is the first fragment, in accordance with the present invention, allows the computer to directly access fragment 3 by obtaining its location from the Fragment Pointer List. Thus, the computer reads from the Fragment Pointer List that fragment 3 starts in sector 6 and is one sector in length. Sector 6 can then be directly accessed. If the location of each fragment were stored in the previous fragment, as in prior methods, fragment 3 could be accessed only by first accessing fragment 1 to obtain the location of fragment 2, then accessing fragment 2 to obtain the location of fragment 3, then accessing fragment 3. Thus, the storage of the entire Fragment Pointer List in the first fragment allows the computer to make fewer reads of the disk when accessing fragments than if the location of each fragment were stored in the previous fragment.

Figure 6A:
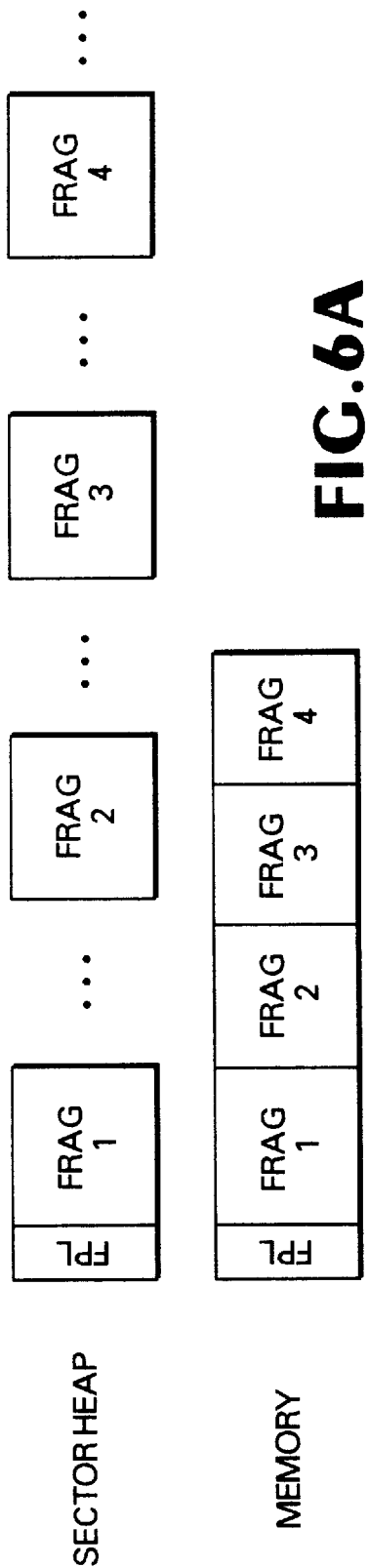
FIG. 6A is a representation of fragments read into memory in accordance with the present invention.

Another advantage of storing the entire Fragment Pointer List in the first fragment is that when multiple fragments are read into memory, fragment location information is not interspersed with the data from the fragments. In the method of the present invention, all fragment location information is stored in the first sector of the first fragment, so that all subsequent fragments contain only data. Therefore, when fragments 1–4 are read consecutively into memory, the memory contains the Fragment Pointer List followed by data from fragments 1, 2, 3, and 4. Because all fragment location information is stored in fragment 1, no such information is stored in fragments 2, 3, or 4. Thus, no fragment location information is interspersed between the data of fragments 2, 3, and 4. This is seen in FIG. 6A.

Figure 6B:
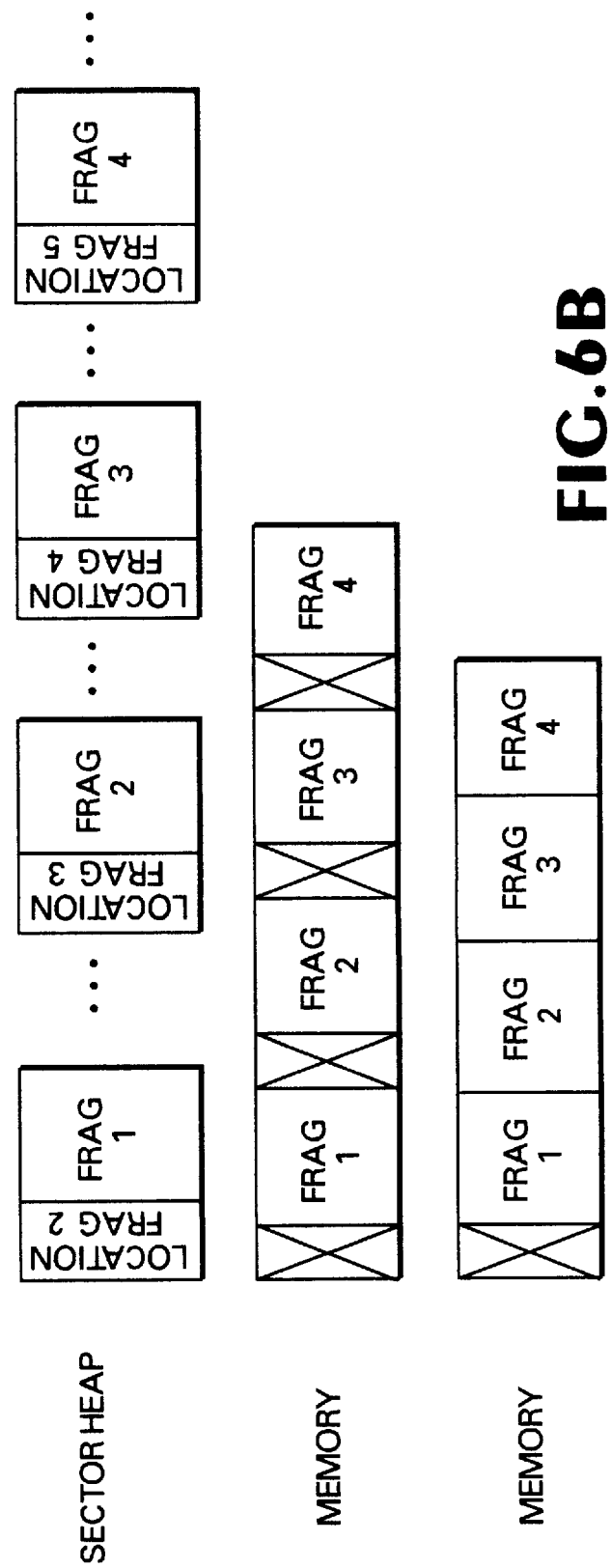
FIG. 6B is a representation of fragments read into memory in accordance with a prior method.

By contrast, prior methods store fragment location information for the next fragment in a header in each prior fragment, as seen in FIG. 6B. Thus, when data is read into memory, fragment headers are interspersed with fragment data. For data in memory to be operated on by the computer, the data must be contiguous. For the data to be contiguous, the fragment headers from fragments 2, 3, and 4 must be eliminated. This is accomplished by copying the fragment data of fragments 2, 3, and 4 over the fragment headers.

This copying operation required by prior methods of storing fragment locations is eliminated by the present invention, thus increasing the efficiency of the computer system.

A further advantage of the present invention is that the computer can read the entire list in one operation. By obtaining the location of each fragment before access of any fragment has begun, the computer can prioritize the sequence of accesses of the fragments. For example, the fragments of the fragmented cluster of FIG. 5A are located such that access of the fragments according only to their fragment number would require multiple, lengthy movements of the head across the disk. To access the fragments in this manner, the head would move from sector 1 (fragment 1) to sector 1001 (fragment 2), then to sector 6 (fragment 3), then to sector 1005 (fragment 4), and so forth until all fragments are accessed. It should be understood that this sequence of accessing fragments requires the read head within the disk drive to move back and forth between distant sector locations on the disk. This slows access time and causes excessive wear of the head, arm, and actuator of the disk drive. By obtaining the sector locations of all fragments prior to initiating access of any fragment, the computer can arrange its accesses of fragments in the most efficient manner. For example, in accordance with the inventive method of storing the Fragment Pointer List, the fragments shown in FIG. 5A may be accessed in the following order: sector 1 (fragment 1), sector 6 (fragment 3), sector 9 (fragment 5), sector 14 (fragment 7), sector 1001 (fragment 2), sector 1005 (fragment 4), sector 1008 (fragment 6), and then finally sector 1012 (fragment 8). This order of access requires much shorter movements of the head of the magnetic disk drive across the disk because the sequence of accesses is determined by location of the fragments relative to the next closest fragment, rather than merely by the next fragment number. This method of access of fragments speeds access time and reduces mechanical wear of the components of the disk drive.

Other prior methods of storing the location of each fragment include storing, in each fragment, the location of the next fragment. For the fragments shown in FIG. 5A, this method would include storing the location of fragment 2 in fragment 1, storing the location of fragment 3 in fragment 2, and so forth for all fragments. This method of storing the location of each fragment suffers from the disadvantage of requiring access of the fragments based only on the fragment number and not on the location of the fragments. Such a storage method would necessitate the access of the fragments in numerical order, such that fragment 1 is accessed first, then fragment 2, then fragment 3, and so forth. This method does not provide a method for optimizing the access of each fragment because the location of each fragment is unknown to the computer until the prior fragment is accessed.

By contrast, the method of the present invention stores all fragment locations in the first fragment. Thus, the computer can obtain all fragment locations before the command is issued for the head to move to the proper location to access each fragment. With all fragment locations known, the computer can make an optimized order of access of the fragments such that head movements are minimized, and access time is reduced. Therefore, the inventive method of storing the list of fragment locations is more efficient than prior methods.

Another prior method of storing a list of fragment locations involves storing the location of each fragment within the MDFAT. However, such a method requires that adequate space be allocated for each sector in the Sector Heap, because each of the sectors in the Sector Heap can potentially be used to store the locations of fragments of a compressed cluster. Therefore, each MDFAT entry would have to be large enough to identify the maximum number of fragments that a cluster could require. This method requires that adequate space be allotted for each sector, even though only a small percentage of sectors in the Sector Heap may actually be used to store fragment locations. Therefore, for sectors that are not used to store fragments, the space allocated for storage of the fragment locations for that sector is wasted.

By contrast, the inventive method uses only as much space as necessary, by storing a Fragment Pointer List only when fragments exist, to store the locations of fragments. Therefore, the method of the present invention makes a much more efficient use of disk storage space.

In summary, the method and format of the present invention provides three distinct improvements over prior methods to dramatically increase the efficiency of the storage of compressed data within the CVF. First, each MDFAT entry uses an extra byte. The extra byte is used to increase the number of sectors that are addressable, and thus increases the size and storage capability of the compressed disk drive.

Second, the method provides for the storage of compressed clusters in fragments such that small, vacant portions of disk space are used to store compressed data. The MDFAT includes a new field for identifying whether each respective compressed cluster is stored within the Sector Heap in fragments.

Third, when compressed data is stored in fragments, a Fragment Pointer List, which stores the location of each fragment, is maintained in the first sector of the first fragment. This is advantageous because the storage of the fragment locations in this manner requires only as much storage space as is actually required, thus no space is wasted. Furthermore, the computer can obtain the location of every fragment in one operation before the access of any fragment has begun. Therefore, the computer can directly access a fragment without having to access any prior fragments and can also optimize the order in which the fragments are accessed, thus reducing access time and reducing wear of the mechanical components of the disk drive.

From the foregoing, it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and way of constructing other embodiments of the present invention will suggest themselves to practitioners of the art. Therefore, the scope of the present invention is to be limited only by the claims below.

what is claimed is:

1. A method for storing at least one cluster of file data in a plurality of fragments of non-adjacent sectors on a disk, each cluster comprising a plurality of sectors, each sector being a fixed length capable of storing a predetermined, fixed number of bytes, said method comprising the steps of:
   maintaining a first data structure having an entry for each file stored on the disk, each entry identifying the cluster in which the first portion of each respective file is stored;
   maintaining a second data structure having an entry for each cluster on the disk, each entry identifying another cluster in which the next portion of each respective file is stored;
   maintaining a third data structure having an entry for each cluster on the disk, each entry identifying the sectors used to store the data for each respective cluster, and each entry identifying whether the data for each respective cluster is stored in fragments;
   identifying the sectors used to store the data of each fragment; and
   placing entries in the first, second, and third data structures in accordance with the location of data stored in each separate cluster.

2. The method of claim 1 wherein each respective entry of the third data structure comprises a first field for identifying the first sector in which the data of each respective cluster is stored.

3. The method of claim 1 wherein each respective entry of the third data structure comprises a second field for identifying whether the data of each respective cluster is stored in fragments.

4. The method of claim 1 wherein each respective entry of the third data structure comprises a third field for identifying:
the number of sectors used to store the data of each respective cluster, if a cluster is not stored in fragments; or
the number of sectors used to store the data of the first fragment of each respective cluster, if a cluster is stored in fragments.

5. The method of claim 1 wherein each respective entry of the third data structure is not greater than five bytes in length.

6. The method of claim 2 wherein the first field of the third data structure is capable of identifying any one of over 8 million sectors.

7. The method of claim 2 wherein the first field of the third data structure is not greater than twenty-three bits in length.

8. The method of claim 3 wherein the second field of the third data structure is one bit in length.

9. The method of claim 4 wherein the third field of the third data structure is capable of identifying up to sixty-four sectors for each respective cluster.

10. The method of claim 4 wherein the third field of the third data structure is not greater than six bits in length.

11. The method of claim 1 wherein the sectors used to store each fragment are identified in a fourth data structure.

12. The method of claim 11 wherein the fourth data structure identifies the first sector of each fragment and the number of sectors used to store each fragment.

13. The method of claim 11 wherein the fourth data structure is stored in the first fragment.

14. The method of claim 11 wherein the fourth data structure is stored in the first sector of the first fragment.

15. A system for storing at least one cluster of file data in a plurality of fragments of non-adjacent sectors on a disk, each cluster comprising a plurality of sectors, each sector being a fixed length capable of storing a predetermined, fixed number of bytes, comprising:
a computer having a memory;
an operating system stored within said memory;
a disk drive operatively connected to said computer for storing data on said disk;
wherein said operating system comprises:
means for maintaining a first data structure on said disk, said first data structure having an entry for each file stored on said disk, each entry identifying the cluster in which the first portion of each respective file is stored;
means for maintaining a second data structure on said disk, said second data structure having an entry for each cluster on said disk, each entry identifying another cluster in which the next portion of each respective file is stored;
means for maintaining a third data structure on said disk, said third data structure having an entry for each cluster on said disk, each entry identifying the sectors used to store the data for each respective cluster, and each entry identifying whether the data for each respective cluster is stored in fragments;
means for identifying the sectors used to store the data of each fragment; and
means for placing entries in said first, second, and third data structures in accordance with the location of data stored in each respective cluster.

16. The system of claim 15 wherein each respective entry of said third data structure comprises a first field for identifying the first sector in which the data of each respective cluster is stored.

17. The system of claim 15 wherein each respective entry of said third data structure comprises a second field for identifying whether the data of each respective cluster is stored in fragments.

18. The system of claim 15 wherein each respective entry of the third data structure comprises a third field for identifying:
the number of sectors used to store the data of each respective cluster, if a cluster is not stored in fragments; or
the number of sectors used to store the data of the first fragment of each respective cluster, if a cluster is stored in fragments.

19. The system of claim 15 wherein each entry of said third data structure is not greater than five bytes in length.

20. The system of claim 16 wherein said first field of said third data structure is capable of identifying any one of over 8 million sectors.

21. The system of claim 16 wherein said first field of said third data structure is not greater than twenty-three bits in length.

22. The system of claim 17 wherein said second field of said third data structure is one bit in length.

23. The system of claim 18 wherein said third field of said third data structure is capable of identifying up to sixty-four sectors for each respective cluster.

24. The system of claim 18 wherein said third field of said third data structure is not greater than six bits in length.

25. The system of claim 15 wherein the sectors used to store each said fragment are identified in a fourth data structure.

26. The system of claim 25 wherein said fourth data structure identifies the first sector of each said fragment and the number of sectors used to store each said fragment.

27. The system of claim 25 wherein said fourth data structure is stored in the first fragment.

28. The system of claim 25 wherein said fourth data structure is stored in the first sector of said first fragment.

29. The system of claim 25 wherein said operating system identifies the sectors used to store each said fragment by reading said fourth data structure prior to accessing any of said fragments.

30. The system of claim 25 wherein said operating system accesses said fragments in a sequence based on the location of each said fragment on said disk.

31. A computer-readable medium on which is stored a program for storing at least one cluster of file data in a plurality of fragments of non-adjacent sectors on a disk, each cluster comprising a plurality of sectors, each sector being a fixed length capable of storing a predetermined, fixed number of bytes, the program comprising instructions which, when executed by the computer, perform the steps of:
maintaining a first data structure having an entry for each file stored on the disk, each entry identifying the cluster in which the first portion of each respective file is stored;
maintaining a second data structure having an entry for each cluster on the disk, each entry identifying another cluster in which the next portion of each respective file is stored;

maintaining a third data structure having an entry for each cluster on the disk, each entry identifying the sectors used to store the data for each respective cluster, and each entry identifying whether the data for each respective cluster is stored in fragments;

identifying the sectors used to store the data of each fragment; and placing entries in the first, second, and third data structures in accordance with the location of data stored in each separate cluster.

32. The medium of claim 31 wherein each respective entry of the third data structure comprises a first field for identifying the first sector in which the data of each respective cluster is stored.

33. The medium of claim 31 wherein each respective entry of the third data structure comprises a second field for identifying whether the data of each respective cluster is stored in fragments.

34. The medium of claim 31 wherein each respective entry of the third data structure comprises a third field for identifying:

the number of sectors used to store the data of each respective cluster, if a cluster is not stored in fragments; or the number of sectors used to store the data of the first fragment of each respective cluster, if a cluster is stored in fragments.

35. The medium of claim 31 wherein each respective entry of the third data structure is not greater than five bytes in length.

36. The medium of claim 32 wherein the first field of the third data structure is capable of identifying any one of over eight million sectors.

37. The medium of claim 32 wherein the first field of the third data structure is not greater than twenty-three bits in length.

38. The medium of claim 33 wherein the second field of the third data structure is one bit in length.

39. The medium of claim 34 wherein the third field of the third data structure is capable of identifying up to sixty-four sectors for each respective cluster.

40. The medium of claim 34 wherein the third field of the third data structure is not greater than six bits in length.

41. The medium of claim 31 wherein the sectors used to store each fragment are identified in a fourth data structure.

42. The medium of claim 41 wherein the fourth data structure identifies the first sector of each fragment and the number of sectors used to store each fragment.

43. The medium of claim 41 wherein the fourth data structure is stored in the first fragment.

44. The medium of claim 41 wherein the fourth data structure is stored in the first sector of the first fragment.

* * * * *